United States Patent [19]

Saunders et al.

[11] Patent Number: 4,716,531

[45] Date of Patent: Dec. 29, 1987

[54] TWO LANE ENGINE CONTROL SYSTEM

[75] Inventors: Arthur F. Saunders, Gloucester, England; Edward S. Eccles, Bishops Cleeve, Near Cheltenham, United Kingdom

[73] Assignees: Dowty and Smiths Industries Controls Limited, Cheltenham; Smiths Industries Public Limited Company, London, both of England

[21] Appl. No.: 871,134

[22] Filed: Jun. 2, 1986

Related U.S. Application Data

[63] Continuation of Ser. No. 603,871, Apr. 25, 1984, abandoned.

[30] Foreign Application Priority Data

May 10, 1983 [GB] United Kingdom ................ 8312822

[51] Int. Cl.[4] ............................................. G06F 11/00
[52] U.S. Cl. .................... 364/431.02; 371/9; 364/187
[58] Field of Search ............... 364/431.02, 187; 371/9; 60/243, 39.281

[56] References Cited

U.S. PATENT DOCUMENTS

| | | | |
|---|---|---|---|
| 3,786,433 | 1/1974 | Notley et al. ........................... | 371/9 |
| 4,032,757 | 6/1977 | Eccles ........................... | 364/431.02 |
| 4,153,198 | 5/1979 | Eki et al. ........................... | 371/9 |
| 4,200,226 | 4/1980 | Piras ........................... | 371/9 |
| 4,248,040 | 2/1981 | Kast ........................... | 371/9 |
| 4,251,873 | 2/1981 | Joby ........................... | 371/9 |
| 4,444,048 | 4/1984 | Nitschke et al. ........................... | 371/9 |
| 4,504,905 | 3/1985 | Burrage ........................... | 371/9 |

Primary Examiner—Parshotam S. Lall
Attorney, Agent, or Firm—Pollock, Vande Sande and Priddy

[57] ABSTRACT

A control system for a gas-turbine engine has two parallel control units, either one of which can be switched to supply control signals to the engine in response to input signals, such as from the pilot's control lever and from various sensors. Each unit has a limiter that limits the fuel supply to the engine if the engine speed approaches or exceeds a predetermined maximum. A monitor unit in each control unit detects when the limiter has assumed control of the engine for more than a predetermined time, and switches the system to control by the other control unit. The predetermined engine speed may be different for different settings of the pilot's control lever. The monitor unit in such an arrangement, may receive signals in respect of the acceleration and deceleration of the engine and switch to the other control unit only when the speed is outside the predetermined speed for the pilot lever setting, and when the acceleration or deceleration is not such as to bring the speed back within the predetermined speed.

13 Claims, 4 Drawing Figures

TWO LANE ENGINE CONTROL SYSTEM

This application is a continuation of application Ser. No. 603,871, filed Apr. 25, 1984, now abandoned.

BACKGROUND OF THE INVENTION

This invention relates to engine control systems and, more especially, to aircraft engine control systems.

It is now becoming increasingly common for aircraft engines to be controlled by electrical signals rather than by mechanical and hydraulic means. The electrical control of engines enables greater flexibility, automation and efficiency of operation, together with a reduction in weight. Various arrangements are used to reduce the consequences of failure in the control system such as caused by damage to the components or to the programming software. For example, a limiter is commonly used, which may be either a mechanical or electrical device and which operates to prevent occurrence of an excessive engine condition, such as supply of too much or too little fuel for safe operation. The limiter acts to maintain operation just within the safety limits despite instructions from the control system to exceed those limits.

Two or more identical control lanes may be provided to the engine, each capable of operating independently, together with means for detecting malfunction of a lane and for switching to another lane. While such duplex arrangements can improve the ability of the system to operate safely, there can nevertheless be difficulties such as, in identifying which of the lanes is operating correctly. Such systems can also be too expensive for certain applications.

BRIEF SUMMARY OF THE INVENTION

It is an object of the present invention to provide a control system that can be used to alleviate the above-mentioned disadvantages.

According to one aspect of the present invention there is provided an engine control system including first control means that is arranged to supply control signals to control operation of an engine in response to input signals, limiter means that is arranged to receive signals representative of actual or demanded operation of the engine, the limiter means being operable to limit operation of the engine, and second control means that is operable to take over control of the engine from the first control means when signalled to do so, the system including monitor means having timer means, said monitor means being arranged to provide an output response signal when the engine has been operated at or outside predetermined operational conditions for more than a predetermined time, and the output response signal being supplied to the second control means to cause the second control means to take over control of the engine from the first control means.

The fact that the engine has been operated at or outside predetermined operational conditions for more than a predetermined time, such as, for example, one second, provides an indication that the control signals supplied to the engine by the first control means are erroneous, and therefore results in the second control means taking over engine control.

The monitor means may be arranged to provide an output signal when the engine has been operated for more than a predetermined time at a speed that is close to or beyond a predetermined maximum or minimum speed. The system may include first and second fuel control valves arranged to control flow of fuel to the engine, said first control valve being controlled by said first or second control means, and said second control valve being arranged to be controlled directly by said limiter means. The limiter means may be arranged to receive input signals in respect of the temperature of the engine. The control means may include means for testing said limiter means. The first and second control means may be substantially identical. Both the first and second control means may include processing means that is operable to supply the control signals to the engine in response to the input signals, and the output of each processing means may be connected to a respective relay switching of which is controlled by a respective logic unit. Each logic unit may be arranged to receive a first input signal in respect of operation of the respective monitor means, a second input signal in respect of operation of the other logic unit, and a third signal in respect of malfunction of the respective processing means. Each logic unit may be arranged to receive an input signal in respect of operation of a manual switch. The processing means may be arranged to produce a coded signal indicative of correct functioning of the processing means, each control means including a watchdog unit that receives the coded signal and that is arranged to produce an output signal to the respective logic unit in response to an error in the coded signal indicative of malfunction of the respective processing means.

The predetermined operational conditions of the engine are preferably different at different demanded speeds of the engine. The monitor means may be arranged to receive signals representative of the rate of change of an operational condition of the engine, the monitor means being arranged to provide the output response signal only when the operational condition of the engine is outside the predetermined operational condition at the demanded speed of the engine and if the rate of change of the operational condition is not such as to bring the operational condition within the predetermined operational condition for more than a predetermined time.

According to another aspect of the present invention there is provided an engine control system including first and second parallel control lanes that are selectively operable such that one of said lanes supplies control signals to control operation of an engine in response to input signals, limiter means that is arranged to receive signals representative of actual engine operation, said limiter means being operable to limit operation of the engine to within predetermined operational conditions, monitor means that is arranged to provide an output response signal when the engine has been controlled by said limiter means for more than a predetermined time, and the output response signal being supplied to cause the other of said first or second control lanes to take over control of the engine.

According to a further aspect of the present invention there is provided an engine control system including first and second parallel control lanes that are selectively operable such that one of said lanes supplies control signals to control operation of an engine in response to input signals, monitor means that is arranged to receive signals representative of actual and demanded engine speed and of engine acceleration or deceleration, said monitor means being arranged to provide an output response signal when the actual engine speed is above a predetermined maximum engine speed or below a predetermined minimum engine speed for more than a predetermined time and if the engine acceleration or declaration is not such as to bring the engine speed within the predetermined maximum and minimum speeds, and said output response signal being arranged to cause the other of said control lanes to take over control of the engine from the one lane.

Accordingly to yet another aspect of the present invention there is provided a method of controlling an engine in which control signals are supplied to the engine to control operation thereof, operation of the engine being limited by limiter means in response to signals representative of actual or demanded operation of the engine, operation of the engine being monitored by monitor means to determine when the engine has been operated at or outside predetermined operational conditions for more than a predetermined time, and control of the engine being switched to alternative control means by the monitor means in response to operation at or outside said predetermined operational conditions for more than said predetermined time.

The predetermined operational conditions may be different at different demanded speeds of the engine, the monitor means switching control to alternative control means only when the operational condition of the engine is outside the predetermined operational condition at the demand speed of the engine and if the rate of change of the operational condition is not such as to bring the operational condition within the predetermined operational condition for more than a predetermined time.

Control systems for an aircraft gas-turbine engine, in accordance with the present invention, will now be described, by way of example, with reference to the accompanying drawings.

DETAILED DESCRIPTION

Figure 1:
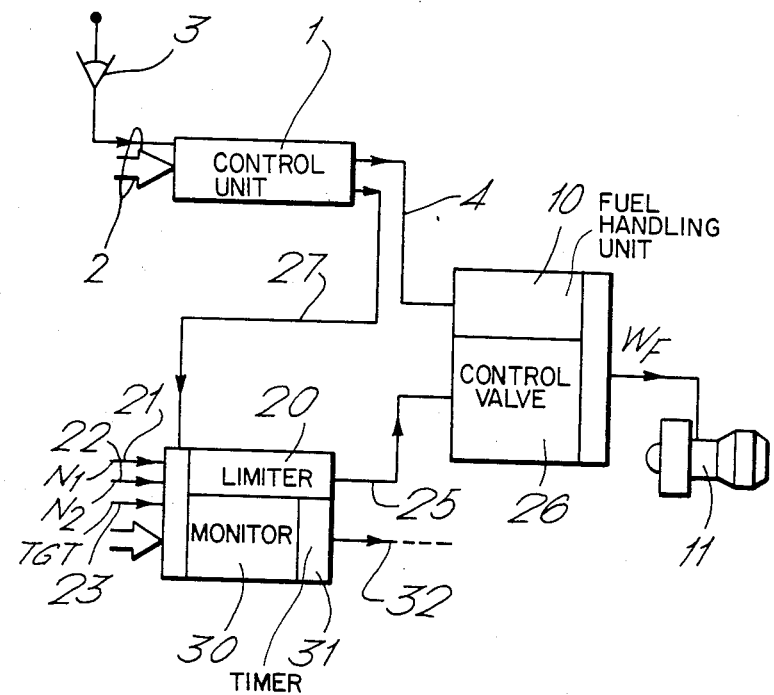
FIG. 1 shows a simplified control system and engine.

With reference to FIG. 1 the control system includes a control unit 1 that receives various input signals on lines 2, such as, from a pilot's control lever 3. The control unit 1 provides output signals on line 4 to a fuel handling unit 10. The fuel handling unit 10 operates to control the flow of fuel $W_F$ to the gas-turbine engine 11 and, in this respect the control unit 1 and fuel handling unit operate together such that a change in the thrust demanded by the pilot, and signalled by change in the position of the control lever 3, causes a change in the fuel flow $W_F$ to the engine. Also included in the control system is a limiter unit 20 which receives directly, and independently of the control unit 1, input signals on lines 21 to 23 representative of operation of the engine 11. More particularly, the signal on line 21 is representative of the engine fan speed $N_1$, the signal on line 22 is representative of the engine core speed $N_2$, and the signal on line 23 is representative of engine temperature TGT. The limiter unit 20 provides output signals on line 25 to a control valve 26 that is separate from the control valve associated with the fuel handling unit 10. The limiter unit 20 functions in a known manner to prevent the engine 11 being operated outside safe limits. More particularly, the limiter 20 prevents operation of the engine at speeds or temperatures high enough to cause damage, or at speeds or temperatures too low to sustain correct operation. The limiter unit 20 monitors the speed and temperature of the engine 11 and, if these inputs start to go outside the safe operational limits, the limiter unit overrides the control unit 1 and takes over control of the engine so as to run the engine at a constant rate, just within the operational limit. If the output from the control unit 1 reverts to a value such as to operate the engine within its safe operational limits then the engine is controlled normally by the control unit. The control system as so far described is entirely conventional.

The control system of the present invention additionally includes a monitor unit 30 which also receives the inputs supplied to the limiter unit 20. The monitor unit includes a timer 31 and is arranged to produce an output on line 32 if the input signals indicate that the engine 11 has been operated at, or close to, its operational limits by the limiter unit 20 for more than one second, or some other predetermined time. The fact that the limiter unit 20 has been in operation for more than one second is indicative of a fault in the control unit 1, its inputs, the fuel handling unit 10, or the interconnection between the control unit, fuel handling unit and the engine. The output signal from the monitor unit 30 on line 32 is supplied to another part of the system (described later, but not shown in FIG. 1) to bring a second, alternative control lane into operation which takes over from the control unit 1. The limiter unit 20 also receives signals on line 27 from built-in test equipment (not shown) within the control unit 1 which enables the control unit to test the limiter unit for correct operation prior to the engine being switched on. The control unit 1 itself may, as a result of self tests both prior to and during engine running, effect a switch to the alternate lane. A failure of the limiter unit 20, such as would cause erroneous limiter operation, also causes switching to a second lane. The second control lane can be of various different constructions according to the degree of sophistication of the system. In its simplest form it may, for example, be a direct mechanical interconnection of the pilot lever with a fuel control valve, by-passing the control unit 1; in a more sophisticated arrangement it can be a complete duplication of the control unit and fuel handling unit of the first lane.

A dual-lane system will now be described with reference to FIG. 2. The two lanes are indicated by the numerals 100 and 200 respectively, both lanes receiving signals from different sets of sensors that respond to nominally-identical values. Both lanes 100 and 200 provide nominally-identical output signals on lines 101 and 201 respectively, one of the outputs being selected by relays 102 and 202 for supply to the same fuel handling unit 300.

The first lane 100 includes a processing unit 103 that receives inputs from a set of sensors 104, the pilot's control lever 105, and from a logic unit 250 in the second control lane 200. The processing unit 103 provides the output signals on line 101 together with outputs on lines 106 and 107. The output on line 106 is supplied to an OR gate 108 and to a logic unit 150, which in turn supplies a signal on a line 151 to the second lane 200 and to a second logic unit 250. The output on line 107 is supplied to a watch-dog unit 109 which in turn supplies an output to the OR gate 108. The OR gate 108 additionally receives an input on line 110 from a manual lane change switch 111. Also included in the first lane 100 is a monitor unit 112 and a limiter or overspeed switch 113. The switch 113 receives directly, and independently of the processing unit 103, signals on lines 114 and 115 indicative respectively of engine fan speed $N_1$ and engine core speed $N_2$. In addition, the overspeed switch 113 may receive engine temperature signals TGT on line 116. The output from the overspeed switch 113 controls operation of a relay 117 connected in a power supply line 118 and is also supplied to an input of the monitor unit 112. The monitor unit 112 also receives input signals from the pilot's lever 105, the output from the monitor unit being supplied as the final input of the OR gate 108.

The output from the OR gate 108 is supplied to the logic unit 150, via line 120, together with the output on line 251 from the second logic unit 250. The output of the logic unit 150 in the first lane 100 controls switching of the relay 102 that is connected in the output line 101 from the processor unit 103.

Figure 2:
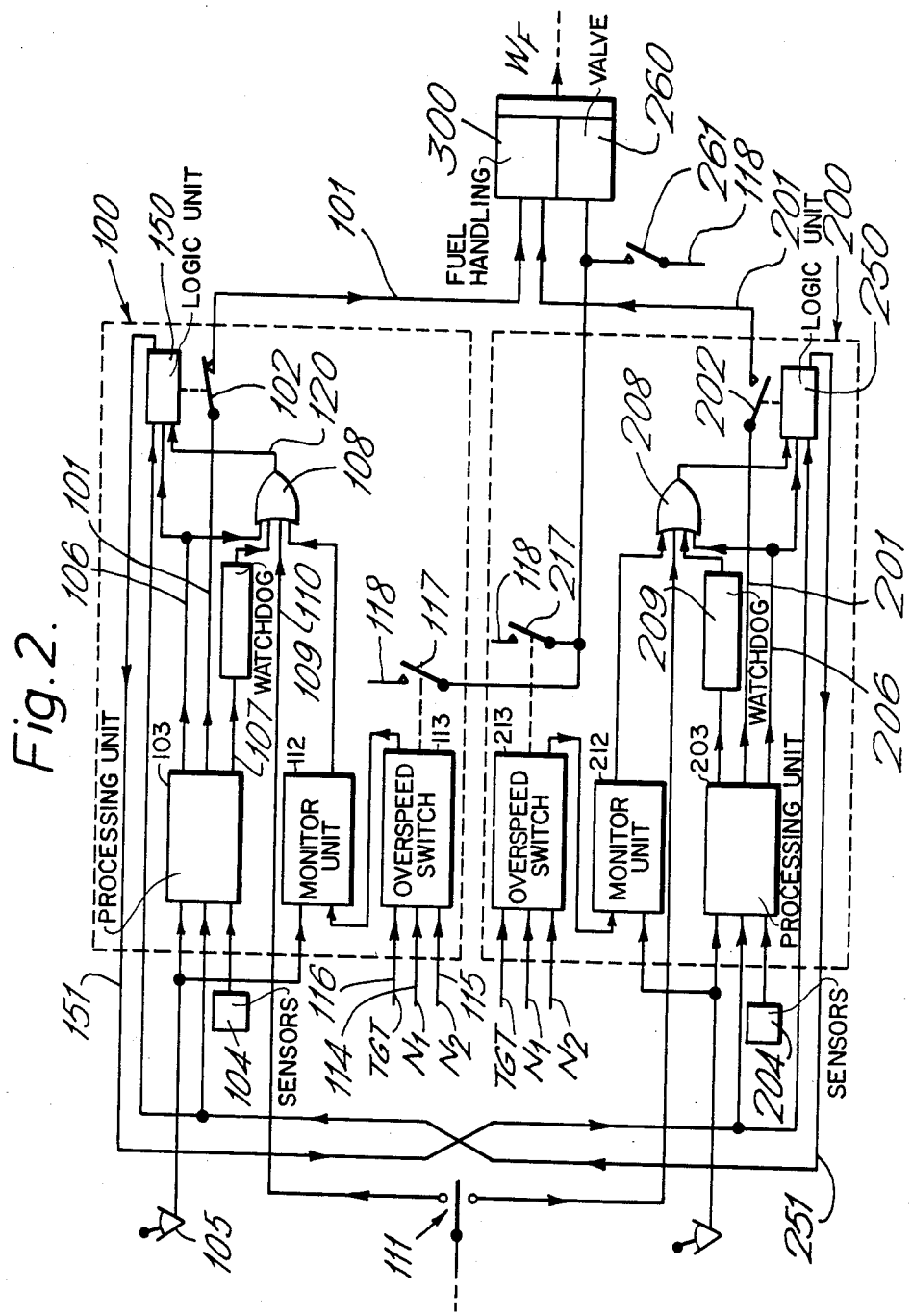
FIG. 2 shows a control system similar to that of FIG. 1 in greater detail.

The second lane 200 is identical in most respects to the first lane and, in FIG. 2, the components having an equivalent in the first lane are indicated by the same number to which one hundred has been added. The inputs to the second lane 200 are nominally identical to those of the first lane but are obtained from separate sensors 204 so as to provide a degree of redundancy. The overspeed switch 213 in the second lane controls switching of a relay 217 that is connected in the power supply line 118. The power supply line 118 is connected to a solenoid-operated fuel valve 260 that can be used to control fuel supply to the engine if either relay 117 or 217 is closed. A separate, manually-actuable switch 261 is also connected to the power supply line 118 so as to enable power to be supplied to the valve 260 independently of operation of the relays 117 and 217.

In normal operation, the relay 102 is closed and the relay 202 is open, so that signals on line 101 from the first lane are supplied to the fuel handling unit 300. The processing unit 103 functions in the conventional manner to supply signals to the fuel handling unit 300 so as to cause efficient engine operation in accordance with instructions signalled by the pilot lever 105. The relay 202 is held open by the output from the logic unit 250. The first lane 100 is disconnected from control of the fuel handling unit 300 by the logic unit 150 when malfunction is detected, as represented by a signal to any one of the three inputs to the logic unit 150. The input on line 120, from the OR gate 108, is dependent on there being a signal on any one of the four inputs to the OR gate. The first input, on line 106, directly from the processing unit 103, is generated when a self-test facility within the processing unit detects a malfunction. The second input to the OR gate 108 is from the watch-dog unit 109 which receives periodic coded signals generated by the processing unit 103. The production of the correct coded signal is dependent on correct functioning of the processing unit 103. A malfunction in the processing unit can be indicated by an error in the coded signal which is detected by the watchdog unit 109. The third input to the OR gate is on line 110 from the switch 111 and enables the pilot or flight engineer to revert to the second lane by appropriately changing the position of the switch. The fourth and final input to the OR gate 108 is derived from the monitor unit 112.

The monitor unit 112 operates in a similar manner to the monitor unit 30 in the arrangement of FIG. 1, and provides an output signal when it senses that the overspeed switch 113 has been in operation for more than one second. In this respect, the overspeed switch 113 operates as a limiter, detecting when the engine speed exceeds or approaches a predetermined maximum limit and then closing the relay 117. Power is supplied to the valve 260 so as to maintain fuel supply to the engine just within safe operational limits. If the speed signals, or the temperature signal TGT on line 116 remain above the predetermined maximum values for more than one second the monitor unit 112 produces an output to the OR gate 108. Similarly, if the speed or temperature fall below predetermined values for more than one second the monitor unit 112 produces a signal to cause the second lane 200 to override the first lane unless shutdown of the engine is required, as indicated by the position of the pilot's lever 105 or the switch 261. When the logic unit 150 opens the relay 102, a signal is supplied along line 151 to an input of the processing unit 203 and the second logic unit 250 in the second lane 200. This causes the output on line 206 from the processing unit 203 to be removed, which was previously such as to cause the OR gate 208 to send a signal to the logic unit 250 so as to hold the relay 202 open. The output of the OR gate 208 therefore goes to zero providing there are no signals at its other inputs, and thereby closes the relay 202. The first lane 100 is then held disconnected by signals from the logic unit 250 on line 251 which are supplied to the logic unit 150.

It will be appreciated that if both processing units 103 and 203, or their inputs, fail such as to cause an excessively high speed, the overspeed switches 113 and 213 will close both relays 117 and 217. This will actuate the solenoid-operated valve 260 thereby preventing excessive supply of fuel to the engine.

Figure 3:
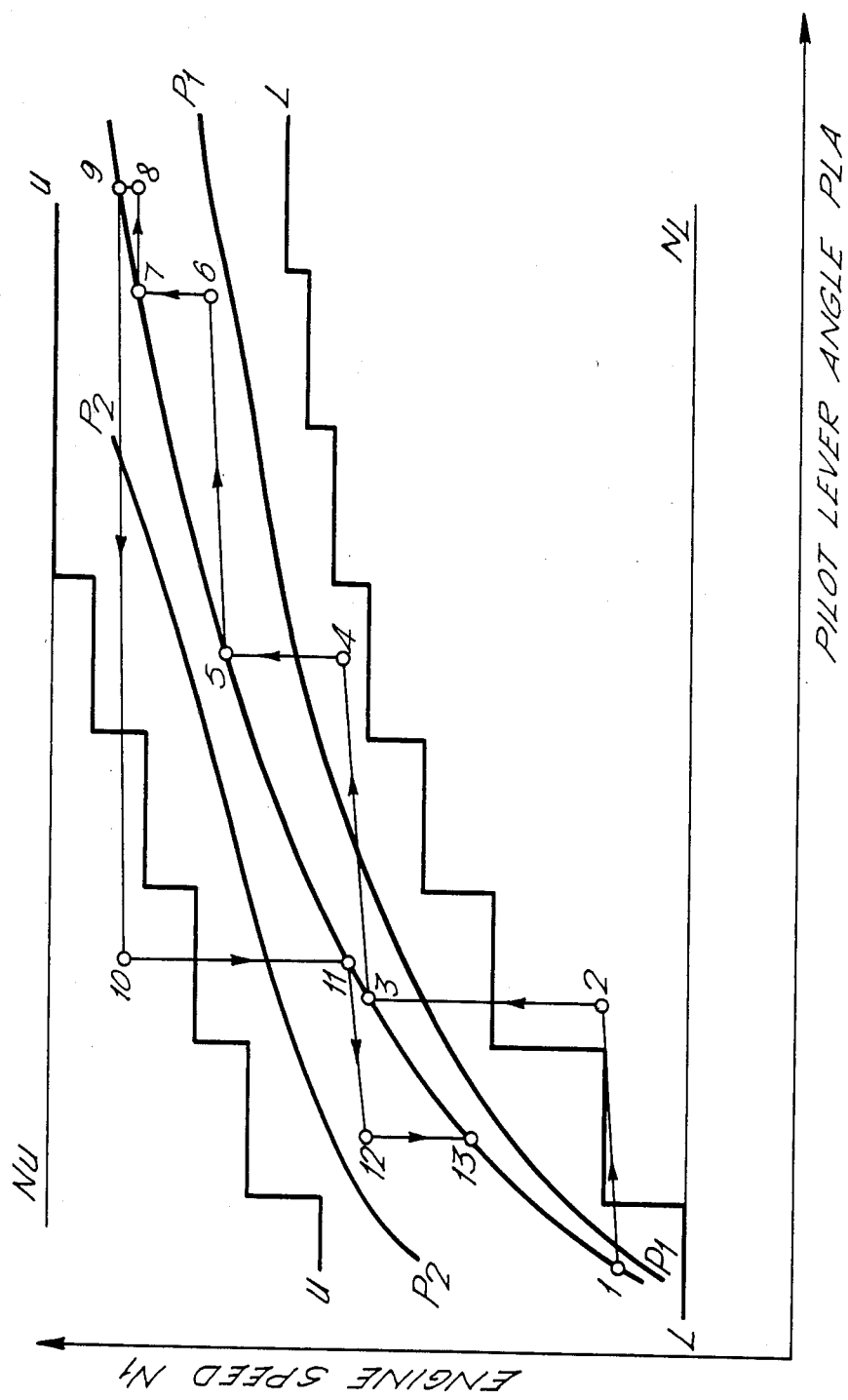
FIG. 3 is a graph of engine speed against pilot lever angle.

Although the monitor units 112 and 212 described above have fixed limits for the absolute upper and lower safe operational limits of the engine, the limits could be adjustable. In this respect, the limits could vary according to pilot lever angle such that the limits are lower at lower pilot lever angles (equivalent to lower demanded thrust). Such a system will obviously respond to malfunctioning earlier than a system using fixed limits. With reference to FIG. 3 there are shown plots of the lower limit L and the upper limit U of engine speed $N_1$ against pilot lever angle PLA. The lower limit L is selected to be just below the plot $P_1$ of engine speed at sea-level on a cold day while the upper limit U is selected to be just above plot $P_2$ of the engine speed at an altitude of 35,000 feet.

Because of the time lag between movement of the pilot's lever and the engine speed reaching the level at which it will produce the thrust demanded by the pilot, the operation of the engine will not usually follow plots of the kind shown as $P_1$ and $P_2$. Instead, a typical plot of engine operation is shown as defined by points 1 to 13 for a discontinuous movement of the lever. From this it will be seen that a significant part of the operational cycle occurs outside the upper and lower limits and that this is not in any way a malfunction of the control system. Obviously, it would be undesirable for a lane switching to be caused by operation outside the limits in these circumstances. To overcome this danger of unwanted lane switching, where variable limits are set, the monitor unit or the limiter includes a differentiating unit that receives the fan speed signal $N_1$ and produces an acceleration signal $\dot{N}_1$. If the engine speed $N_1$ is below the lower limit L, the monitor unit is arranged to cause lane switching only if $\dot{N}_1$ is zero or negative for more than a predetermined time, such as, for example one second. Thus, in normal operation, such as at the point 2, the engine speed will be increasing, so as to reach the point 3 within the operational limits and therefore $\dot{N}_1$ will be positive and no lane switching will occur. Similarly, when the engine speed $N_1$ is above the upper limit the monitor unit is arranged to cause switching only if $\dot{N}_1$ is zero or positive, indicating that the engine is not moving towards its operational limits. Such a system is illustrated schematically in FIG. 4.

Figure 4:
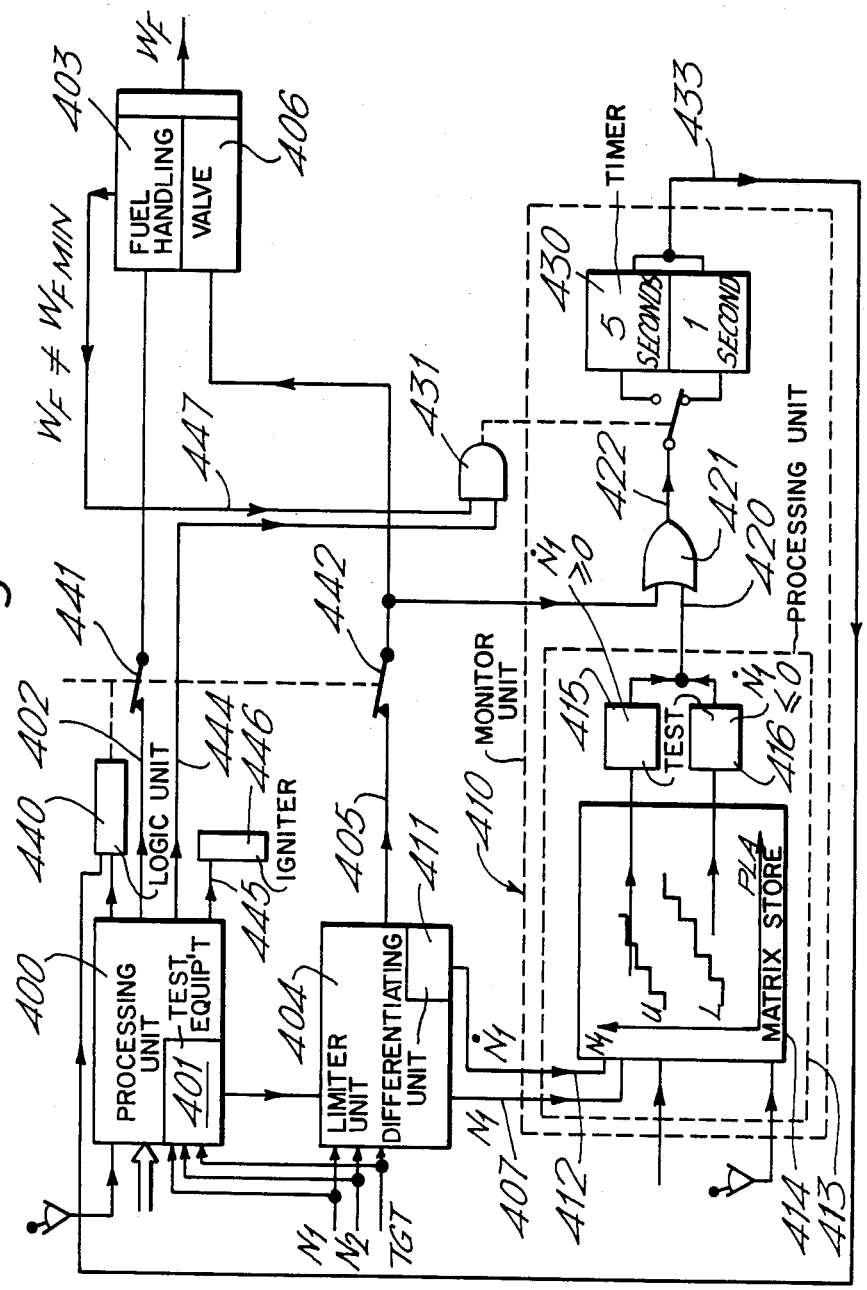
FIG. 4 shows schematically an alternative control system.

In FIG. 4, the processing unit is indicated as 400, which also includes built-in test equipment 401 and supplies output signals on line 402 to a fuel-handling unit 403. A limiter unit 404 supplies output signals on line 405 to a separate limiter valve 406 only when preset maximum or minimum limits of engine speed $N_U$ and $N_L$ or temperature are passed. These limits are not variable with pilot lever angle but are the fixed maximum and minimum values of safe operation, as shown in FIG. 3. The limiter 404 receives the usual input signals and supplies engine speed signals $N_1$ along line 407 to a monitor unit 410; the limiter also includes a differentiating unit 411 which derives acceleration signals $\dot{N}_1$ and supplies these along line 412 to the monitor unit 410. The monitor unit 410 includes a processing unit 413 that has a matrix store 414 of the variable limits of engine speed $N_1$ against pilot lever angle PLA, as shown in FIG. 3. If the value of $N_1$ lies above the upper limit U, the value of $\dot{N}_1$ is passed to a first test unit 415 which produces an output on line 420 if $\dot{N}_1$ is zero or positive. If the value of $N_1$ lies below the lower limit L, the value of $\dot{N}_1$ is passed to a second test unit 416 which produces an output on line 420 if $\dot{N}_1$ is zero or negative. The output on line 420 is supplied to an OR gate 421 within the monitor unit 410 together with any output signals from the limiter 404 on line 405. When there is an input on either line 420 or 405 to the OR gate 421, it produces an output on line 422 to a timer 430. The time interval of the timer 430 is selectable to be either 1 second or 5 seconds, under control of an AND gate 431. If a signal is produced on line 422 for more than the selected time interval, the timer 430 produces a signal at the output of the monitor unit on line 433 which is supplied to a logic unit 440. The logic unit 440 is operable to effect switching to an alternative control lane or system, (not shown), and opens relays 441 and 442 in lines 402 and 405 respectively.

In normal operation, the timer 430 is set to the one second interval. The purpose of the provision of a selectable longer time interval—five seconds—is to maintain the engine under control of the illustrated control system when the engine flame has been extinguished and when the processing unit 400 is functioning correctly to relight the flame. The AND gate 431 receives two inputs: one from the processing unit 400 on line 444 which is indicative of relight being attempted (by signals on line 445 to the igniter 446); and the other form the fuel-handling unit 403 on line 447 which is indicative that the fuel flow $W_F$ is not equal to the minimum fuel flow $W_{FMIN}$.

It will be appreciated that many modifications are possible within the scope of the present invention. While some of the units of the control systems described above have been referred to as separate units, in practice some of the functions of these units may be achieved by programming of a single computer or some other analogue or digital computing element.

What is claimed is:

1. An engine control system comprising: first and second control means; means for supplying input signals to said first and second control means; means for supplying output signals from one of said first and second control means to control operation of an engine in response to said input signals; relay means connected intermediate said first and second control means and said engine, said relay means being operable to supply output signals to the engine from either said first control means or said second control means; limiter means; means for supplying signals representative of the actual performance of the engine to said limiter means independently of said first or second control means, the limiter means being operable to override control of said engine by said first or second control means, and said limiter means itself controlling operation of said engine not to exceed predetermined operational parameters, when the one of said control means then controlling the engine causes said engine to exceed said predetermined operational parameters; monitor means having timer means therein, said monitor means providing an output response signal when the engine has been operated at said predetermined operational parameters for more than a predetermined period of time; and means supplying said output response signal from said monitor means to said relay means to disconnect the one of said control means which is producing the limited control of said engine and to connect instead the other of said control means to said engine.

2. An engine control system according to claim 1, wherein said monitor means provides an output response signal when the engine has been operated for more than a predetermined time at a speed that is close to or beyond a predetermined maximum or minimum speed.

3. An engine control system according to claim 1, wherein the first and second control means are substantially identical.

4. An engine control system according to claim 1, wherein both the first and second control means include a respective processing unit, a relay, means connecting each said relay in series between the engine and the respective control means, a logic unit, and means connecting each logic unit to a respective relay to control switching of said relay.

5. An engine control system according to claim 4, including means supplying a first input signal to each logic unit in respect of operation of the respective monitor means, means supplying a second input signal to each logic unit is respect of operation of the other said logic units, and means supplying a third input signal to each logic unit in respect of malfunction of the respective processing unit.

6. An engine control system according to claim 5, wherein said system includes a manual switch, and means supplying a fourth input signal to each logic unit in respect of operation of said manual switch.

7. An engine control system according to claim 4, wherein each said processing unit produces a coded signal dependent on correct functioning of said processing unit, and wherein each control means includes a watchdog unit, means for supplying said coded signal to said watchdog unit, said watchdog unit producing an output signal in response to an error in said coded signal, and means supplying the output signal from the watchdog unit to the respective logic unit.

8. An engine control system comprising: first and second substantially identical parallel control lanes each of which includes a respective control means; means for supplying nominally identical input signals to the control means in both of said control lanes; relay means connecting either the first or second control lane to control an engine; limiter means; means for supplying signals representative of actual engine operation to said limiter means independently of the control means in said first and second control lanes, said limiter means being operative to override control of said engine by said first or second control lanes and said limiter means itself controlling the supply of fuel to said engine to limit operation of the engine when the demanded operation of said engine is such as to take it outside predetermined operational parameters; monitor means; means supplying signals to said monitor means indicative of control of said engine by said limiter means, said monitor means having timer means therein and providing an output response signal when the engine has been operated at said predetermined operational parameters for more than a predetermined period of time; and means supplying said output response signal to said relay means to disconnect the control lane producing the limited control of said engine from the engine, and to connect instead the other of said control lanes to the engine.

9. An engine control system according to claim 1 or 8, wherein the said predetermined operational parameter of the engine are different at different demanded speeds of the engine.

10. An engine control system according to claim 9, wherein the system includes means for deriving signals representative of the rate of change of an operational condition of the engine; means supplying the rate of change signals to the monitor unit, the monitor unit providing the said output response signal only when the engine has been operated outside predetermined operational parameters for more than a predetermined time and if the rate of change of the operational condition is not such as to bring the operational condition within the predetermined operational parameters for more than a predetermined time.

11. An engine control system according to claim 10, wherein said operational condition is the actual engine speed, and wherein the said rate of change of the operational condition is the acceleration or deceleration of the engine.

12. An engine control system according to claim 10, including timer means that is switchable between two different times, means for providing a signal indicative that engine relight is being attempted, and means for switching said timer means to the longer of said different times if engine relight is being attempted.

13. An engine control system comprising: first and second substantially identical parallel control lanes, each of said control lanes including a respective control means, means for supplying nominally identical input signals to said control means in both of said control lanes; relay means for connecting either the first or the second of said control lanes to an engine to control the engine; limiter means; means for supplying signals representative of actual engine operation to said limiter means independently of said control means in said control lanes, said limiter means overriding control of said engine by the one of said control lanes that is then controlling supply of fuel to said engine to limit operation of the engine not to exceed first predetermined operational conditions, when the demanded operation of said engine is such as to take it outside said first predetermined operational conditions; monitor means; means supplying signals to said monitor means indicative of actual and demanded engine speed; means supplying signals to said monitor means indicative of engine acceleration or decleration, said monitor means having timer means therein and providing an output response signal only when the engine has been operated for more than a predetermined time interval outside second predetermined operational conditions, which are different at different demanded speeds of the engine, and if the engine acceleration or decleration is not such as to bring the engine speed within the second predetermined operational conditions; and means supplying said output response signal to said relay means to disconnect the control lane which is producing the limited control of said engine from the engine, and to connect instead the other of the control lanes to the engine.

* * * * *